Dec. 8, 1931.　　　　L. J. MILDREN　　　　1,835,891
CASING HEAD AND TUBING SUPPORT
Filed Jan. 28, 1930
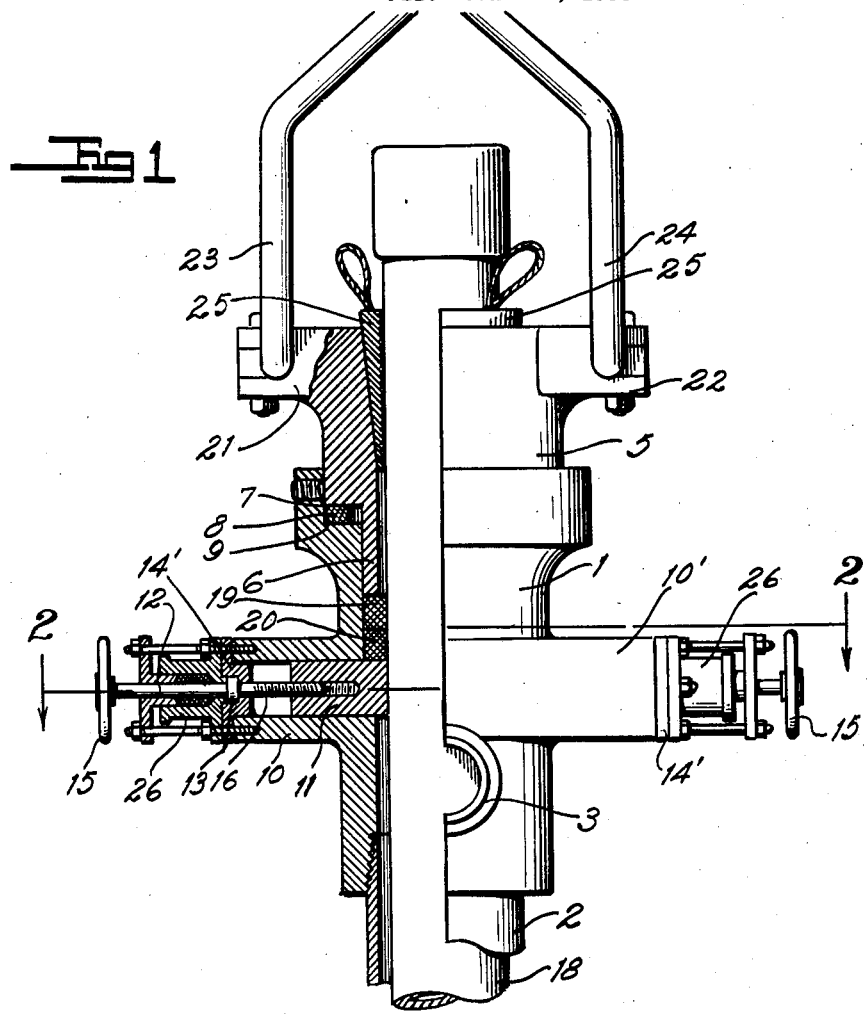
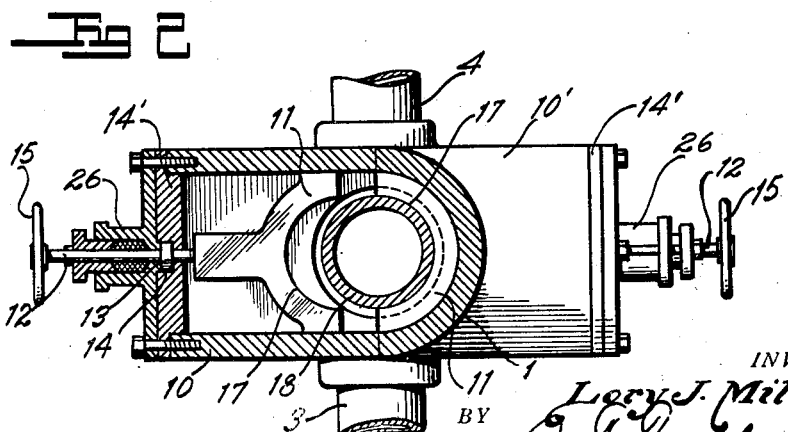
INVENTOR
Lory J. Mildren
BY
ATTORNEY Patented Dec. 8, 1931

1,835,891

UNITED STATES PATENT OFFICE

LORY J. MILDREN, OF PONCA CITY, OKLAHOMA, ASSIGNOR TO HINDERLITER TOOL COMPANY, OF TULSA, OKLAHOMA, A CORPORATION OF OKLAHOMA

CASING HEAD AND TUBING SUPPORT

Application filed January 28, 1930. Serial No. 424,100.

This invention relates to casing heads for oil wells and the like. The primary object of the invention is to provide a casing head so constructed that packing can be easily and conveniently introduced around the tubing even when there is considerable pressure in the well.

When the casing head is on the casing and it is desired to run in the tubing, the packing is introduced into the head around the tubing usually to rest upon a shoulder in the head. If there is much gas pressure in the well, considerable difficulty is encountered in setting the packing because the pressure tends to blow the packing out of the head. I have provided a head with outlets or ports below the packing and I have provided a valving packing support which can be retracted within a recess in the head when the tubing is introduced, the valving support being then projected across the space between the inner wall of the head and the outer wall of the tubing so as to shut off the gas pressure from flowing up through the packing space and to divert the gas pressure through the ports in the head so that the packing can be easily applied preparatory to setting the tubing spider and slips on the head.

The novelty of the invention will be apparent by reference to the following description in connection with the accompanying drawings in which:

Fig. 1 is a view partly in longitudinal section and partly in elevation of a casing head to which my invention is applied.

Fig. 2 is a sectional view on the line 2—2 of Figure 1.

Referring now to the drawings by numerals of reference, 1 designates the main body of the head to the lower end of which the casing 2 may be secured in the usual way. The member 1 is provided with diametrically opposite outlet ports 3 and 4. A collar 5 is provided with a constricted cylindrical skirt 6 snugly fitting the bore of the member 1 and it is provided with a shoulder 7 resting upon the packing 8 carried by the shoulder 9 on the member 1 whereby the collar 5 is supported by the member 1 and its joint is packed against leakage. The main body or member 1 is provided with oppositely disposed recessed portions or boxes 10 and 10' in which the semi-circular or arcuate valving packing supports 11 are slidably moved by the actuating rods 12 which are provided with collars 13 in recesses 14 in the ends of the offset recessed portions 10 and 10'. The rods 12 may be actuated by any suitable means, as for example, by the wheels 15. The screw threaded ends 16 of rods 12 engage the sliding valving packing blocks or members 11 so that when the rods or shafts 12 are turned, the arcuate edges 17 of the members 11 can be moved toward and away from the tubing 18. When the members 11 snugly fit around the tubing 18, they are in positions to support the packing rings 19 and 20 which also fit around the tubing and which are held in place by the bottom of the skirt 6. The oppositely disposed lugs 21 and 22 on the collar 5 carry bails 23 and 24 by means of which the collar can be raised and lowered. The collar is provided with tubing supporting members shown as slips 25 which can be introduced in the usual way to support the tubing as shown.

When the casing has been set and it is desired to run in the tubing 18, the sliding valving packing blocks 11 will be retracted within the boxes 10 and 10' so as to permit the tubing to be lowered into the well. When the tubing has been run in, the valve rods or shafts 12 will be turned to cause the packing members 11 to fit snugly around the tubing, valving off or cutting off the flow of gas pressure in the head above the ports 3 and 4. Then, the packing rings 19 and 20 can be put in place after which the spider or collar 5 may be placed in the position as shown in Figure 1 with the skirt 6 resting upon the packing 19 and 20 and the shoulder 7 resting upon the packing 8. By valving off the flow of gas, if any exists above the ports 3 and 4, the assembly of the packing members 19 and 20 and the spider or collar carrying the tubing will be facilitated because without some means for cutting off the gas pressure at the top of the head, it is difficult to introduce the packing members 19 and 20 but with the members 11 fitting around the tubing, the introduction of the packing rings 19 and 20, as well as the packing 8, can be accomplished with ease without liability of the packing members being forced upwardly by the pressure in the casing around the tubing.

It will be observed that the sliding members 11 constitute gates and that their inner edges embrace the tubing when the inner ends of the gates abut so that they valve off the flow of gas around the tubing into the upper part of the head.

I have shown removable packing glands or boxes 26 at the ends of the boxes 10 and 10' and I have shown the collars 13 in recesses 14 in the removable end plates 14'. This is for the ease of manufacture and assembly but I do not wish to be limited to the precise construction shown, for obviously, changes may be made in form, proportion and minor details of construction without departing from the spirit of the invention or sacrificing any of its advantages.

What I claim and desire to secure by Letters-Patent is:—

1. A casing head having diametrically opposite recessed portions, complementary sliding gate members in the recesses, each having a semi-circular edge so that when the two gate members abut they embrace tubing in the head and means for actuating the gate members, packing members above the gate members adapted to rest thereon, a collar resting on the casing head and having a skirt extending into the casing head, bearing against the packing members supported by the gate members, and means carried by the collar for supporting the tubing.

2. A casing head having diametrically opposite recessed portions, gate members sliding in the recess portions, each having a semi-circular edge so that when the two gate members abut they will embrace tubing in the head, packing members supported by the gate members, a collar supported by the upper end of the casing head having a skirt extending into the head, bearing against the packing members, and means for supporting tubing in the collar.

3. A casing head having diametrically opposite recesses in its wall, sliding gate members in the recesses, having tubing embracing edges, means for actuating said gate members, packing members supported by the gate members, a collar having a shoulder in the upper end of the casing head, a skirt on the collar resting upon the packing members, supported by the gate members, and means carried by the collar for supporting tubing.

In testimony whereof I affix my signature.

LORY J. MILDREN.